United States Patent [19]

Cowsar

[11] 4,201,822

[45] May 6, 1980

[54] NOVEL FABRIC CONTAINING MICROCAPSULES OF CHEMICAL DECONTAMINANTS ENCAPSULATED WITHIN SEMIPERMEABLE POLYMERS

[75] Inventor: Donald R. Cowsar, Birmingham, Ala.

[73] Assignee: The United States of America as represented by the Secretary of the Army, Washington, D.C.

[21] Appl. No.: 48,285

[22] Filed: Jun. 13, 1979

[51] Int. Cl.[2] .................................................. B32B 5/16

[52] U.S. Cl. ............................................ 428/240; 2/2; 2/239; 2/243 A; 252/316; 428/245; 428/260; 428/327; 428/905

[58] Field of Search ............... 428/240, 245, 260, 327, 428/905; 2/2 R, 239; 252/316

[56] References Cited

U.S. PATENT DOCUMENTS

| | | | |
|---|---|---|---|
| 3,427,250 | 2/1969 | Haas et al. | 252/316 |
| 4,152,784 | 5/1979 | McGalleard | 2/239 |

*Primary Examiner*—James J. Bell

*Attorney, Agent, or Firm*—Nathan Edelberg; Robert P. Gibson; Kenneth P. Van Wyck

[57] ABSTRACT

Novel clothing fabrics containing microcapsules in a resin finish comprising reactive chemical decontamination agents encapsulated within a semipermeable polymer which is selectively permeable to toxic chemical agents but impermeable to the decontamination agents, thereby allowing the toxic chemicals to diffuse into the microcapsules where they undergo irreversible detoxifying chemical reactions.

10 Claims, No Drawings

NOVEL FABRIC CONTAINING MICROCAPSULES OF CHEMICAL DECONTAMINANTS ENCAPSULATED WITHIN SEMIPERMEABLE POLYMERS

DEDICATORY CLAUSE

This invention was developed under a Government contract with the Department of the Army, Contract DAAA15-77-C-0015. The invention described herein may be manufactured, used and licensed by or for the Government for governmental purposes without the payment to me of any royalty thereon.

BACKGROUND OF THE INVENTION

The military has had a long standing need for protective clothing which would protect the wearer from toxic chemical agents. Currently, there are two mechanisms by which a textile material may afford protection against chemical agents. One mechanism is sorption, which has been provided by carbon-treated foams and non-woven fabrics. The other mechanism is chemical deactivation, which is presently provided by chloroamide-treated clothing items. The sorptive charcoal in current protective garments does not neutralize chemical agents but merely sorbs them. Sorptive charcoal therefore presents a potential problem of subsequent desorption. The chloroamides used in chemical deactivation readily liberate hypochlorite in the presence of moisture and chloroamide-treated clothing causes severe skin irritation in some individuals. In addition, clothing which has been treated with chloroamides gradually loses its effectiveness and requires periodic retreatments.

Many bulk reagents have been effective neutralizers and decontaminants for chemical warfare agents. Current storable formulations are based upon strong-base reagent combinations such as lithium hydroxide in monoethanolamine (MEA) and sodium hydroxide and diethylenetriamine in methyl cellulose. Unstable formulations such as sodium and calcium hypochlorite (chlorox and HTH) are also effective. Hydroxamic acids, oximes, phenols, and metal-ion complexes are all effective in promoting the deactivation of chemical agents in aqueous solutions. However, none of the bulk chemicals have been suitably formulated for application to fabrics to provide protective clothing.

Microcapsules have been used in numerous other applications to separate active ingredients, to control odor, to mask taste, to control volatility and flammability, to moderate chemical reactivity, to provide slow release of contents and to protect the environment. In particular, microcapsules of sodium hydroxide have been used to remove phenols and organic acids from refinery waste water; microcapsules containing organic solvents have been used to remove MEA from aqueous solutions and microcapsules of methyl parathion within semipermeable nylon are marketed as controlled-release pesticides.

The present invention has overcome the disadvantages of prior protective clothing through development of agent-reactive microcapsules that can be applied to fabrics or finished garments to provide reactive sites for neutralization of chemical agents. Specifically, the invention involves microencapsulation of conventional decontamination chemicals that are currently effective for deactivation of toxic mustard blistering agents (H agents); and toxic nerve agents known conventionally as G agents, e.g., isopropyl methyl phosphonofluoridate (GB, sarin) and the V agents, e.g., VX and formulation of the microcapsules in a resin finish that can be uniformly applied to fabric substrates.

SUMMARY OF THE INVENTION

A clothing fabric for protecting the wearer from cutaneous and percutaneous toxic chemical agents comprising fabric containing microcapsules of reactive chemical-decontamination agents encapsulated within semipermeable polymers and bound uniformly to the fabric surfaces by a resin finish. The preferred fabric contained a solid decontamination agent consisting essentially of 90% sym-bis(N-chloro-2,4,6,-trichlorophenyl)urea and 10% ZnO, in ethyl cellulose microcapsules which are bonded to the fabric with an acrylic binder.

It is the principal object of this invention to provide clothing fabric which will afford protection to the wearer from cutaneous and percutaneous toxicity of chemical agents.

It is a further object of this invention to provide a novel fabric containing microcapsules comprising reactive chemical decontamination agents encapsulated within semipermeable polymers which are impermeable to the decontamination agent and are selectively permeable to toxic chemical agents.

It is a still further object of this invention to provide a fabric containing a decontamination agent wherein the decontamination agent is protected from decomposition by heat, moisture and light.

Another object of this invention is to provide a novel fabric containing microcapsules of conventional decontamination agents which are bonded to the fabric through the use of acrylic binders in a resin finish.

These and other objects of this invention will become apparent from the following detailed description of the invention.

DESCRIPTION OF THE INVENTION

The invention is directed to the preparation of agent-reactive microcapsules that can be applied to fabrics or finished garments to provide reactive sites for neutralization of toxic chemical agents. Specifically, the invention contemplates the microencapsulations of conventional chemicals that are currently used to deactivate the toxic mustard (H), G and V agents for incorporation within resin finishes which can be applied uniformly to fabric substrates.

Although a number of methods are available for preparation of microcapsules, interfacial polymerization and organic phase separation are the most feasible methods.

Interfacial polymerization and phase separation methods were used to microencapsulate both aqueous and nonaqueous materials including aqueous sodium hydroxide, monoethanolamine, ethylenediamine, N,N-dichlorodimethyl-hydantoin, sym-bis(N-chloro-2,4,6-trichlorophenyl)urea, and calcium hydrochlorite, in polyamide and ethyl cellulose walls. The preferred microcapsules containing a decontamination agent were obtained by organic phase separation with ethyl cellulose microcapsules containing a solid decontamination agent consisting of 90% sym-bis(N-chloro-2,4,6-trichlorophenyl)urea and 10% ZnO (XXCC3 agent). The microcapsules were then bonded to the fabric with an acrylic binder emulsion and their deactivation potential for nitrogen mustard (HD) was evaluated. When the microcapsules of XXCC3 in ethyl cellulose were applied to fabric at a level of 8.2 mg/sq cm HD vapor penetrations of 6 mg/sq cm were found at liquid contamination densities of 2.4 g/sq m.

Other microcapsules have been prepared and evaluated comprising polyamide microcapsules containing aqueous solutions of alkali metal hydroxide and primary and secondary amines. Initial evaluation of polyamide microcapsules containing cores of alkali-metal hydroxides, e.g., sodium hydroxide and aliphatic amines, have given good results, though the microcapsule walls are permeable to carbon dioxide since alkali-metal hydroxides and various amines readily form carbonates and carbamates which may cause reduced activity of the decontamination agent.

With regard to the development of solutions that deactivate GB on contact, fast reaction rates have been observed for solutions of N,N-(dimethylamino)pryidine in monoethanolamine as a useful microcapsule system.

The microcapsules of this invention require polymeric wall materials that are stable with the highly reactive core reagents used, i.e., bulk decontaminants for effective containment of reagent and ready permeability to chemical warfare agents. The very thin walls of the microcapsule, i.e., 1 to 10 microns, allow for rapid agent permeation for optimum decontamination results.

The preparation of the novel microcapsules and impregnated fabric of this invention can best be shown by the following specific examples of the practice of this invention, which are meant to be merely illustrative and not limiting upon the invention.

EXAMPLE 1:

Microencapsulation of XXCC3 Decontamination Agent in Ethyl Cellulose

A nearly saturated solution of ethyl cellulose (Dow Ethocel Type 20) was prepared by the addition of 4 g of polymer to 98 g of refluxing cyclohexane. The solution was heated and stirred with a 4-blade impeller at 800 rpm until the ethyl cellulose had dissolved. Stirring was then increased to 1500 rpm, 4 g of XXCC3, i.e., 90% sym-bis(N-chloro-2,4,6-trichlorophenyl)urea and 10% ZnO, was added and the heat source was removed. As the solution was stirred and allowed to cool, the polymer separated from solution and encapsulated the dispersed XXCC3. After 2 hours, the microcapsules were isolated by filtration and washed with cold cyclohexane. Residual solvent was removed by the application of vacuum. The yield of microcapsules was 3.9 g, and the microcapsules were all $\leqq$ to 250 $\mu$m in diameter. Screening of these microcapsules for mustard reactivity revealed rapid rates of decontamination. We found that 0.30 g of ethyl cellulose microcapsules which contained 75% of XXCC3 would deactivate 87% of neat mustard (0.02 g) in less than one hour.

The microcapsules was incorporated in a resin finish by the following procedure; a solution of acrylic emulsion (E-1126 by Rohm and Haas) was prepared by the addition of 75 gm of the concentrate to 125 gm of water containing 1.88 gm of $NaHCO_3$. The microcapsules (262 mg) were then added, and the solution was stirred for five minutes. A small swatch of previously washed 8 ounce (226.8 g) sateen fabric (9-cm diameter) was placed in a sintered-glass funnel, and the solution containing the microcapsules was vacuum filtered through the funnel. The fabric was then removed from the funnel, and the resin was allowed to cure at ambient temperature overnight. The dried sample was then weighed to obtain the percent add on. Scanning electron micrographs indicated that the microcapsules were bonded well to the fabric substrate. The degree of loading gave a density for XXCC3 of 0.4 mg active Cl per sq cm of fabric.

Evaluation of Fabric Treated with XXCC3 in Ethyl Cellulose Microcapsules

Agent vapor penetration resulting from mustard (HD) contamination was measured by a standard permeation cell using 0.5 mil polyethylene film as a skin simulant in the bottom of the cell under the sample support. A 10-sq cm sample of fabric was then fitted into the sample support. HD was applied with an air-aided dropping apparatus directly to the top surface of the sample in the form of discrete microdroplets. Four 0.6 mg drops of HD provided a contamination density of 2.4 g/sq m. After contamination, the top of the cell was put in place. The clamp was positioned, and the bolt tightened to a torque of 30 in-lbs. The cell was placed in a thermostated cabinet (30°-34° C.), and air at 32° C. and 66% RH was pulled across the contaminated surface of the fabric at 960 ml/min. At the same time air at 32° C. and 66% RH was pulled at 960 ml/min through the bottom of the cell under the polyethylene film. HD was collected at the air outlet side of the cell with adsorbent cartridges. The cartridges were changed at appropriate intervals and eluted with 3 ml of ethanol. The ethanol eluents were assayed for HD with a gas chromatograph equipped with a flame photomultiplier detector. Initially, microcapsules were applied to one side of the fabric samples at levels of 4.0 mg/sq cm and lower, with the results shown in the table below. Increased microcapsule levels resulted in both decreased evaporation and permeation rates, but even higher levels were needed for permeation of HD to remain less than the desired limit of 1 mg/sq cm. Loading was increased from 4.0 mg/sq cm to 8.2 mg/sq cm by coating each side of the fabric at a loading of 4.0 mg/sq cm in two separate steps with one side of the fabric allowed to cure overnight before the other side of the fabric was treated.

Deactivation of HD by XXCC3 in Ethyl Cellulose Microcapsules Bonded to Fabric

| Sample | Microcapsule loading, mg/sq cm | Time, hr | Amount evaporated, % | Amount permeated, % | Total agent permeated, µg/cm |
|---|---|---|---|---|---|
| 8949-5-F12 | 0 | 0.5 | 15 | 3 | |
| | | 1.5 | 44 | 12 | |
| | | 3.5 | 64 | 19 | |
| | | 5.5 | 69 | 21 | 54 |
| -F2 | 0.8 | 0.5 | 5 | 2 | |

-continued

| Deactivation of HD by XXCC3 in Ethyl Cellulose Microcapsules Bonded to Fabric | | | | | |
|---|---|---|---|---|---|
| Sample | Microcapsule loading, mg/sq cm | Time, hr | Amount evaporated, % | Amount permeated, % | Total agent permeated, μg/cm |
| | | 1.5 | 31 | 10 | |
| | | 3.5 | 43 | 15 | |
| | | 5.5 | 45 | 16 | 37 |
| -F7 | 2.1 | 0.5 | 17 | 3 | |
| | | 1.5 | 42 | 12 | |
| | | 3.5 | 45 | 13 | |
| | | 5.5 | 45 | 14 | 32 |
| -F5 | 3.2 | 0.5 | 12 | 3 | |
| | | 1.5 | 29 | 9 | |
| | | 3.5 | 33 | 12 | |
| | | 5.5 | 33 | 12 | 29 |
| -F6 | 4.0 | 0.5 | 8 | 2 | |
| | | 1.5 | 23 | 8 | |
| | | 3.5 | 27 | 11 | |
| | | 5.5 | 27 | 11 | 27 |
| 8949-19-G1 | 8.2 | 0.5 | 10 | 0.4 | |
| both sides | | 1.5 | 14 | 1 | |
| of fabric | | 3.5 | 18 | 2 | |
| | | 5.5 | 19 | 2.4 | 5.8 |

Microcapsules could also be applied to the fabric by cutting small swatches of fabric and dip coating them in an emulsion containing suspended microcapsules, but this method does not yield the uniform coating of microcapsules obtained by the method illustrated in Example 1.

EXAMPLE 2:

Microencapsulation of Aqueous Decontaminants, e.g., Monoethanolamine (MEA) and Polyethyleneimine (PEI) in Polyamide Microcapsules A mixture consisting of 45 milliliters of mineral oil, 20 ml of benzene, and 0.2 g of sodium aluminum silicate was stirred at 1350 rpm with a 4-blade impeller stirrer until the solid silicate was evenly dispersed. A core solution of 0.6 g of diethylenetriamine, 0.6 g ethylenediamine, 0.2 g of sodium carbonate, 1.9 g of poly(ethyleneimine)(DOW PE1400 TM) and 0.62 g of monoethanolamine was added, and the two phases were emulsified at 1350 rpm for 20 seconds. The stir rate was then slowed to 700 rpm, and a mixture comprising 2.5 g of sebacoyl chloride, 0.5 g of trimesoyltrichloride, 0.05 g sodium aluminum silicate, and 5 ml of hexane was added rapidly. A polyamide wall formed rapidly around the core microdroplets. The microcapsules were stirred at 700 rpm for 1 hour to ensure that wall formation was complete, and then the microcapsules were isolated by filtration and washed with two 50-ml portions of petroleum ether. The dry microcapsules weighed 7.0 g and ranged from 50-150 micrometers (μm) in diameter.

Microcapsules placed in open containers and subjected to a constant temperature of 22° C. and 63-65% RH gained 5-10% in weight over a 90-day period and exhibited a more viscous core than "fresh" microcapsules. When subjected to alternating temperature extremes of −4° and +60° C. over a 30 day period, most microcapsules maintained constant weight but they had more viscous cores than the original microcapsules.

The above aqueous-core microcapsules exhibited only a relatively low reactivity with HD. Organic-core polyamide microcapsules containing saturated solutions of N,N-dichlorodimethylhydantoin (RH-195), sym-bis (N-chloro-2,4,6-trichlorophenyl)urea (XXCC3) were prepared by modification of the interfacial polymerization progress of Example 2. Optimization of the process for specific core materials prepared by the modified process of Example 2 is shown in the table below.

| Polyamide Microcapsules with Organic Cores | | |
|---|---|---|
| Batch # | Core reagents | |
| 8699-92 | Tetrachloroethylene | 67% |
| | Epichlorohydrin | 29% |
| | RH-195 | 4% |
| 8699-120 | $CCl_4$ | 92% |
| | XXCC3 | 8% |
| 8699-126 | $CHCl_3$ | 96% |
| | CC2 | 4% |

Evaluations of microcapsules containing cores of alkali-metal hydroxides and aliphatic amines suggest that the deactivation potential of these microcapsules gradually decreases as the microcapsules are aged. Studies indicate that unencapsulated monoethanolamine and sodium hydroxide also react slowly with HD.

The deactivation of mustard (HD) by a solution comprising 90% monoethanolamine, 5% sodium hydroxide, and 5% water was very slow, as shown in the following table. Approximately 50% of the HD was decontaminated over a period of 8 hours. Microcapsules prepared with these reagents decontaminated only 30% HD over the same period. Aging in a closed container for 3 months showed only a slight reduction in activity, e.g., 24% decontamination in 8 hours. Results with alkali-metal hydroxides and aliphatic amine solutions containing 1% of the nucleophilic agent 4-(N,N-dimethylamino)pyridine indicated that the pyridine compound provided no significant enhancement in decontaminating ability of hydroxides for HD.

| Deactivation of HD by Polyamide Microcapsules Containing Monoethanolamine and Sodium Hydroxide | | | | | |
|---|---|---|---|---|---|
| | | | % HD remaining after | | |
| Sample | Core reagents | | 1 hr | 5 hr | 8 hr |
| Solution | MEA | 95% | 90 | 68 | 50 |
| | NaOH | 5% | | | |

-continued

Deactivation of HD by Polyamide Microcapsules Containing Monoethanolamine and Sodium Hydroxide

| Sample | Core reagents | | % HD remaining after 1 hr | 5 hr | 8 hr |
|---|---|---|---|---|---|
| Fresh microcapsules 8699-72 | MEA<br>NaOH | 95%<br>5% | 94 | 80 | 70 |
| Aged microcapsules 8573-130 | MEA<br>NaOH<br>$H_2O$ | 90%<br>5% | 95 | 85 | 76 |
| Solution | MEA<br>NaOH<br>$H_2O$<br>4-(N,N-dimethylamino)pyridine | 89%<br>5%<br>5% | 88 | 60 | 40 |
| Fresh microcapsules 8699-94 | MEA<br>NaOH<br>$H_2O$<br>4-(N,N-dimethylamino)pyridine | 89%<br>5%<br>5% | 94 | 82 | 68 |

The reactivity of polyamide microcapsules containing either an organic solution of CC2 or a slurry of XXCC3 is very low for HD, as shown in the following table, wherein less than 2% HD was deactivated within 4 hours. The CC2 agent is more efficient when used with moisture.

Deactivation of HD by Polyamide Microcapsules Containing CC2 in $CHCl_3$ and XXCC3 Slurried in $CCl_4$

| Sample | Core reagents | % HD remaining after 1 hr | 2 hr | 4 hr |
|---|---|---|---|---|
| Solution | 0.12 M CC2 in $CHCl_3$ | >98 | >97 | >98 |
| Microcapsules 8699-126 | 0.12 M CC2 in $CHCl_3$ | >98 | >98 | >98 |
| Solution | XXCC3 slurried in $CCl_4$ | >97 | >99 | >98 |
| Microcapsules | XXCC3 slurried in $CCl_4$ | >98 | >98 | >98 |

Microcapsules comprising XXCC3 cores and ethyl cellulose walls were found to provide rapid decontamination of HD, with only 13% remaining after 1 hour as shown in the table below. Commercial bleach calcium hypochlorite (HTH) was also tested but decontaminated only 28% of the agent, with microcapsules which were allowed to absorb water vapor at 25%C for several days, i.e., wet, giving 30% decontamination.

Deactivation of HD by Ethyl Cellulose Microcapsules Containing HTH or XXCC3

| Core reagent | % HD remaining after 1 hr | 4 hr | 8 hr |
|---|---|---|---|
| HTH (dry) calcium hypochlorite | 96 | 84 | 72 |
| HTH (wet) | 94 | 80 | 70 |
| XXCC3 (dry) | 13 | 10 | 10 |

The decontamination reactivity of monoethanolamine and sodium hydroxide solutions are much greater for G and V agents than for HD as shown in the following table. A monoethanolamine solution containing 0.5 molal concentration of the hypernucleophilic agent 4-(N,N-dimethylamino)pyridine also demonstrated almost total deactivation of GB, making it particularly well suited for use in polyamide microcapsules for protection from GB.

Deactivation of GB by Polyamide Microcapsules Containing Monoethanolamine and Sodium Hydroxide

| Core reagents | | % GB remaining after 0.5 hr | 1.0 hr | 1.5 hr |
|---|---|---|---|---|
| MEA<br>$H_2O$<br>NaOH | 90%<br>5%<br>5% | 67 | 42 | 40 |
| MEA<br>EtOH<br>4-(N,N-dimethylamino)-pyridine | 14%<br>53% | <0.01 | <0.01 | <0.01 |

The stability of fabrics treated with the preferred ethyl cellulose microcapsules containing XXCC3 is shown in the following table. In one test, the fabric is washed at 45° C. for 1 hour in a Hoover portable washing machine, rinsed in cold water and allowed to dry at ambient temperatures. In the other, the fabric was irradiated in a weatherometer at 40° C. with an RS-4 sunlamp for 24 hours to simulate 1800 hours of sunlight. After equilibration at 80% relative humidity, they were tested for agent permeation. No significant reduction in deactivation ability was noted.

Stability of Treated Fabrics* to Washing and Ultraviolet Irradiation

| Treatment | Agent permeated $\mu g/cm^2$ |
|---|---|
| none | 32 |
| Washed at 45° C. for 1 hour | 28 |
| U.V. irradiated for 24 hrs | 33 |

*Microcapsules applied at a level of 2.1 mg/sq cm.

Tests of polyamide microcapsules containing monoethanolamine and sodium hydroxide indicate that it will deactivate GB at much faster rates than nitrogen mustard (HD), with GB being substantially deactivated upon contact with the microcapsules. Fast reaction rates were also observed with decontamination solutions of N,N-(dimethylamino)pyridine and monoethanolamine in ethanol when used to deactivate GB. An optimum solution of N,N-(dimethylamino) pyridine in monoethanolamic microcapsules of this invention can be used to deactivate both G and V agents which come into contact with the treated fabric. Microencapsules of polyurea can also be formed though they exhibit fragile wall structures which are not desirable for decontamination finishes.

In forming polyamide microcapsules, the efficacy of the interfacial-polymerization method for microencapsulating reactive decon materials is subject to such reaction variables as choice of protective colloids, core reagents, wall-forming monomers, stir rate, and cross-linking reagents. In microencapsulating aqueous droplets, the polymer wall grows outward from the original interface between the aqueous droplets and the continuous organic phase, i.e., the polymer grows into the organic suspending phase and away from the centers of the droplets. As a result, fresh polymer surface tends to be unprotected and the microcapsules become tacky and subject to agglomeration. Inert solids, such as finely divided molecular sieves (sodium aluminum silicate), work well as protective colloids in collecting on the droplet surfaces, and, as the polymer grows outward, more colloid particles adhere to protect the fresh surfaces.

Free polymer can also result from partitioning of amines into the continuous organic phase but this can be minimized by addition of heavy mineral oil to the organic suspending medium.

The phase separation technique used for preparing ethyl cellulose microcapsules is limited to solid core materials that are insoluble or slightly soluble in both hot and cold cyclohexane.

Thus, while ethyl cellulose microcapsules of calcium hypochlorite (HTH) and stabilized XXCC3 can be prepared, microcapsules of N,N-dichlorodimethylhydantoin (RH-195) were not stable. Careful control of temperature and stir rates must be maintained to avoid large agglomerated microcapsules (>300 μm). It is also desirable to sieve the microcapsules in order to obtain the size range (<150 μm) necessary for application to fabric, with smaller microcapsules (<30 μm) providing more uniform filling of voids between the fabric fibers.

The specific amounts of decontaminant agent and semipermeable polymers used to prepare the microcapsules of this invention can be varied within the skill of one in the art to provide optimum inactivation of H, G and V agents. Similarly the amount of resin binding in the finish would be dependent upon the fabric substrate to be treated to provide the essential uniform binding of microcapsules to the fabric to provide effective protection to the wearer from toxic agents. Protection from agent penetration can be further optimized by use of smaller microcapsules and use of improved finishing techniques known to the fabric finishing art.

The novel fabric of this invention has succeeded in providing an effective means for protecting military personnel from toxic chemical agents.

The microcapsule treated fabric of this invention can obviously be used for protective clothing for all personnel which could come into contact with toxic or harmful chemicals, e.g., worker in chemical industries, firefighters and the like.

The principal advantage of the present invention is that the microcapsules protect the decontaminating agent from decomposition by heat, moisture and light. The protective clothing prepared from the novel fabric of this invention maintains its decontamination ability after repeated washings and irradiation by ultraviolet light.

The process of the present invention has application to other microencapsulation techniques where liquid decontaminating agents can be converted to solids, applied to fabrics and thereby provide protective clothing for other chemical agents.

Applicant having disclosed the invention, obvious modification will become apparent to those skilled in the related art. Applicant therefore wishes to be limited only by the scope of the appended claims.

I claim:

1. A novel protective garment fabric comprising a (woven) clothing fabric containing microcapsules of decontamination agents for toxic chemical agents encapsulated with a semipermeable polymer wall material which is selectively permeable to toxic chemical agents but impermeable to said decontamination agent, thereby allowing toxic chemicals to diffuse with the microcapsules and undergo an irreversible neutralization reaction with said decontamination agents.

2. The fabric of claim 1 wherein said microcapsules are uniformly bound to at least one outer surface of the fabric by means of an acrylic binder.

3. The fabric of claim 1 wherein said microcapsules are uniformly applied to the surface of the fabric within a resin finish.

4. The fabric of claim 3 wherein the decontamination agents are selected from conventional decontamination agents for neutralization of the toxic chemical agents mustard, i.e., dichlorodiethyl sulfide agent, G agent and V agent.

5. The fabric of claim 4 wherein the decontamination agents are selected from the group consisting of sodium hydroxide in aqueous solution, monoethanolamine, ethylenediamine, N,N-dichlorodimethylhydantoin, sym-bis(N-chloro-2,4,6-trichlorophenyl)urea, calcium hypochlorite and mixtures thereof.

6. The fabric of claim 5 wherein the wall materials are selected from the group consisting of ethyl cellulose and polyamides.

7. The fabric of claim 6 wherein the microcapsules comprise a solution of monoethanolamine and sodium hydroxide decontamination agent encapsulated within a polyamide wall material.

8. The fabric of claim 6 wherein the microcapsules consist of a decontamination solution of monoethanolamine containing 0.5 molal concentration of the nucleophilic agent 4-(N,N-dimethylamino)pyridine encapsulated within a polyamide wall material.

9. The fabric of claim 6 wherein the microcapsules comprise a sym-bis(N-chloro-2,4,6-trichlorophenyl-)urea decontamination agent encapsulated within an ethyl cellulose wall material.

10. The fabric of claim 9 wherein the microcapsule consisting of 90% sym-bis(N-chloro-2,4,6-trichlorophenyl)urea and 10% ZnO, by weight, within ethyl cellulose are applied to the fabric at a concentration of 8.2 mg/sq cm of fabric.

* * * * *